US012443579B1

(12) United States Patent
Paduroiu et al.

(10) Patent No.: US 12,443,579 B1
(45) Date of Patent: Oct. 14, 2025

(54) SECURE QUERY PROCESSING (71) Applicant: Amazon Technologies, Inc., Seattle, WA (US)

(72) Inventors: Andrei Paduroiu, Bellevue, WA (US); Yaron Burd, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 18/082,559

(22) Filed: Dec. 15, 2022

(51) Int. Cl.
*G06F 16/22* (2019.01)
*G06F 16/245* (2019.01)

(52) U.S. Cl.
CPC ........ *G06F 16/2246* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 7,984,043 B1 | 7/2011 | Waas | |
| 10,289,723 B1 | 5/2019 | Cai et al. | |
| 11,216,454 B1 | 1/2022 | Cole et al. | |
| 11,379,480 B1 | 7/2022 | Breßet al. | |
| 11,620,118 B2* | 4/2023 | Schneuwly | G06N 20/00 717/143 |
| 11,886,582 B1* | 1/2024 | Abdallah | G06N 3/045 |
| 2008/0071785 A1 | 3/2008 | Kabra et al. | |
| 2009/0112792 A1 | 4/2009 | Barsness et al. | |
| 2012/0078951 A1 | 3/2012 | Hsu et al. | |
| 2012/0191642 A1 | 7/2012 | George | |
| 2012/0191690 A1 | 7/2012 | George | |
| 2012/0317447 A1 | 12/2012 | Yildiz et al. | |
| 2013/0191650 A1 | 7/2013 | Balakrishnan et al. | |
| 2015/0379076 A1 | 12/2015 | Grosse et al. | |
| 2017/0193054 A1 | 7/2017 | Tang et al. | |
| 2018/0096166 A1 | 4/2018 | Rogers et al. | |
| 2019/0207974 A1* | 7/2019 | Jas | G06F 16/24565 |
| 2020/0019722 A1* | 1/2020 | Li | G06F 16/2282 |
| 2020/0349163 A1 | 11/2020 | Nadeau et al. | |
| 2020/0404007 A1* | 12/2020 | Singh | G06F 16/24537 |
| 2021/0374235 A1 | 12/2021 | Brossard et al. | |
| 2022/0138195 A1 | 5/2022 | Cole et al. | |
| 2022/0179626 A1* | 6/2022 | Kacherginsky | H04L 9/3236 |
| 2022/0374541 A1 | 11/2022 | Shigematsu et al. | |

(Continued)

OTHER PUBLICATIONS

Yamaguchi, Fabian & Konrad Rieck, "Generalized Vulnerability Extrapolation using Abstract Syntax Trees", ACM ACSAC'12 (2012), 11 pages. (Year: 2012).*

(Continued)

*Primary Examiner* — Scott A. Waldron
(74) *Attorney, Agent, or Firm* — Davis Wright Tremaine LLP (57) ABSTRACT

A distributed database keeps an abstract syntax tree (AST) and an included user code from interacting with a query engine coordinator during the performance of query execution processes. The query engine coordinator is separated into a frontend and backend, where a compiler on the frontend generates an AST and serializes it to be sent to the backend. The backend is implemented in a security environment separate from the front end. The backend deserializes the AST, sanitizes it, and generates a query plan based on the sanitized AST.

20 Claims, 7 Drawing Sheets

(56) References Cited

U.S. PATENT DOCUMENTS

2023/0004669 A1   1/2023  Langseth et al.
2023/0112250 A1*  4/2023  Agrawal ............... G06F 16/221
                                                      707/714

OTHER PUBLICATIONS

Zhuo, Z., et al., "Long short-term memory on abstract syntax tree for SQL injection detection", Wiley publishing, IET Software, (2021) vol. 15, pp. 188-197. (Year: 2021).*
USPTO Non-Final Office Action dated Apr. 25, 2024, U.S. Appl. No. 17/953,038, 15 pages.
International Search Report and Written Opinion mailed Dec. 22, 2023, Patent Application No. PCT/US2023/075042, 15 pages.
USPTO Non-Final Office Action dated Nov. 8, 2023, U.S. Appl. No. 17/988,724, 13 pages.
Wikipedia, "User-defined Function," Retrieved on Apr. 9, 2015 from http://en.wikipedia.org/w/index.php?title=User-defined function &oldid=401094103, 4 pages.
Anonymous, "SQL Abstract Syntax Trees Vocabulary," retrieved on Feb. 17, 2023 from http://ns.inria.fr/ast/sql/index.html, Jan. 28, 2014, 26 pages.
USPTO Non-Final Office Action dated Feb. 26, 2025, U.S. Appl. No. 17/953,038, 18 pages.

* cited by examiner

SECURE QUERY PROCESSING

BACKGROUND

Distributed databases are increasingly being used for a variety of applications, including those for which performance, flexibility, and security are all important factors. Distributed databases are also increasingly being employed in multiuser environments. In these and other environments, security is often difficult to achieve without sacrificing performance and flexibility.

BRIEF DESCRIPTION OF THE DRAWINGS

Various techniques will be described with reference to the drawings, in which.

DETAILED DESCRIPTION

In an example, a distributed database system processes an abstract syntax tree (AST) in a secure manner by isolating a portion of a query engine coordinator from any user program that may be part of generating an AST or be embedded within the AST. For example, a user program is installed on a query engine frontend, separate from a query engine. In an embodiment, a query engine coordinator is separated into two portions, a query engine coordinator frontend and a query engine coordinator back end. A query engine coordinator may be referred to as a coordinator. A query engine coordinator frontend and backend may be referred to as a coordinator frontend and a coordinator backend respectively. The coordinator backend may include an AST that is a copy of an original AST of the coordinator frontend, which allows a query engine to process the backend AST as if it were the original AST. In addition, an AST of the backend may be processed by a sanitizer component to analyze the AST for security risks, remove those risks, and generate a sanitized AST used in compiling a query plan.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
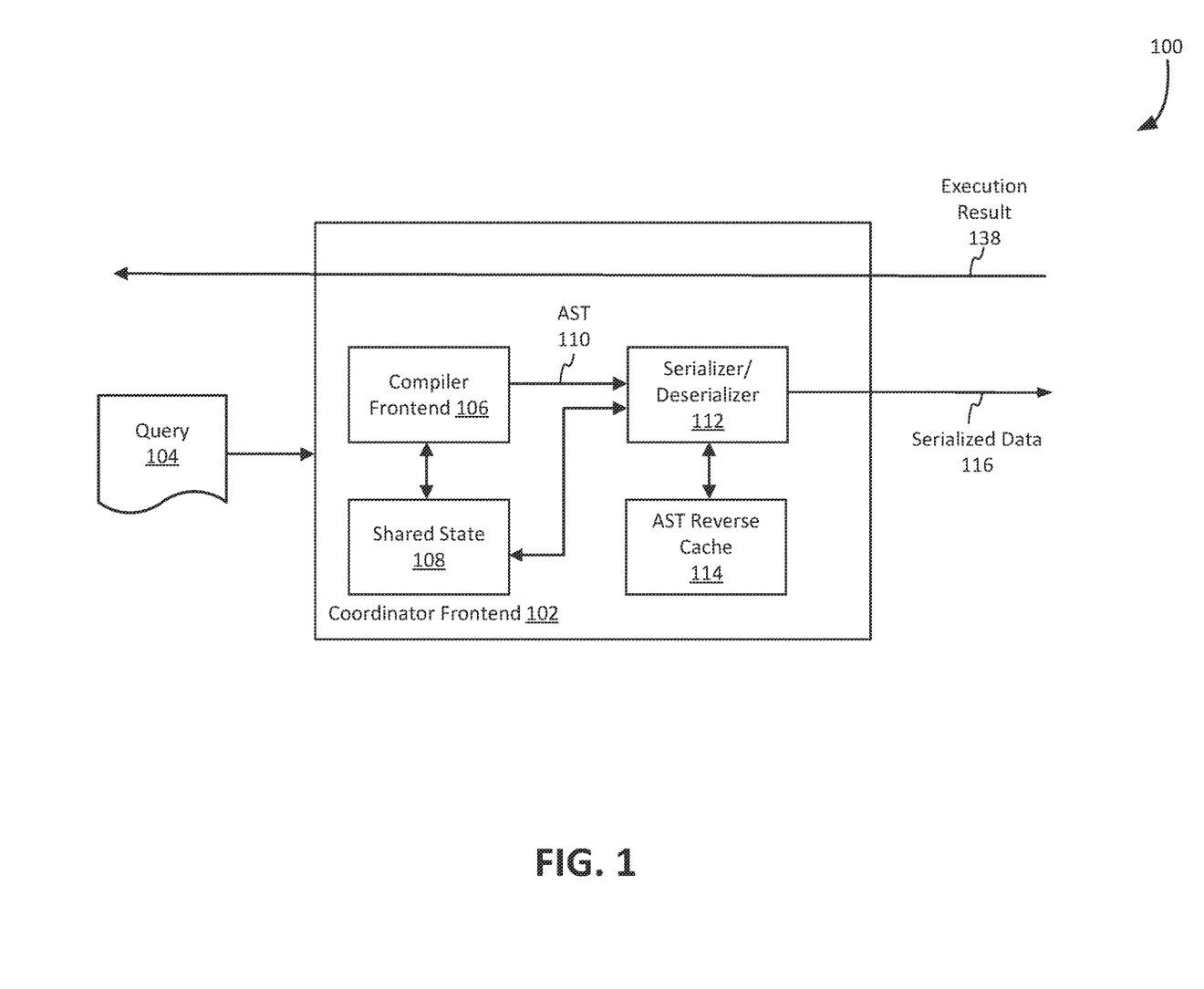
FIG. 1 illustrates an example of aspects of a distributed database system generating and serializing an abstract syntax tree (AST), in accordance with at least one embodiment.

FIG. 1 illustrates an example of aspects of a distributed database system 100 processing ASTs in accordance with at least one embodiment. In this example embodiment, distributed database system 100 comprises a query engine coordinator frontend 102 that processes a query 104 to generate serialized data 116 representing abstract syntax tree (AST) 110. The coordinator frontend 102 includes a compiler frontend 106, shared state 108, serializer/deserializer (SerDe) 112, and AST reverse cache 114.

A query, such as the depicted query 104, may include or correspond to instructions for inserting, updating, deleting, or reading data stored in the distributed database. In at least one embodiment, query 104 is embodied as textual data, which may include but is not limited to structured query language ("SQL") statements or other programming languages. The query 104 may, in some embodiments, be expressed as natural language. The query 104 may also be embodied in code, for example as a sequence of API calls. The query 104 may be referred to as SQL text, an SQL string, or SQL actions.

A distributed database, such as the depicted distributed database system 100, may include any of a variety of computing systems that store and retrieve data using a plurality of computing nodes to store partitioned data. A computing node can include any of a variety of computing devices that comprise at least one processor, a memory device for storing instructions to be processed by the at least one processor, and storage on which a portion of the partitioned data is stored. A query of a distributed database is processed by performing insert, update, delete, and/or read operations on two or more of the plurality of computing nodes that make up the distributed database.

A coordinator frontend, such as the depicted coordinator frontend 102, may include software and/or hardware to perform functions described and attributed to it herein. In an embodiment, a coordinator frontend includes a compiler frontend, shared state information, an AST, serializer/deserializer, and AST reverse cache, which are described further herein. A coordinator frontend may be separated from other portions of the distributed database, such as a coordinator backend, by being located in its own security domain. A coordinator frontend and a coordinator backend can be part of the same process, be part of different processes, be on the same machine, or be on different machines. A coordinator frontend and/or a coordinator backend may be implemented on virtual machines. In an embodiment, a coordinator frontend communicates with a coordinator backend solely via a network connection configured for serialized data. A coordinator frontend may send serialized data to a coordinator backend via a process pipe, API call, network, or some combination thereof. A user or user program may access a coordinator frontend but is prevented from accessing a coordinator backend. In at least an embodiment, a coordinator frontend is configured to receive requests and SQL text from a user. In an embodiment, any component of a coordinator frontend has a communicative connection with at least one other component of that coordinator frontend.

A compiler frontend, such as depicted compiler frontend 106, may include software and/or hardware to perform functions described and attributed to it herein. In an embodiment, a compiler frontend receives requests and SQL text from a user. A compiler frontend may translate a query into an AST, which may be used by the compiler frontend to generate an intermediate representation of the query. In an embodiment, an AST is considered to be an intermediate representation of the query. A compiler frontend may parse a query into pieces to generate a data structure, such as an AST.

A shared state, such as depicted shared state 108 may include software and/or hardware to perform functions described and attributed to it herein. A shared state may be a component configured to store data representing any shared state data, such as a variables, objects, memory spaces, or some combination thereof, that may be accessed by a more than one function, more than one function invocation, more than one query, or some combination thereof. Shared state data may include information related to catalogs, schemas, functions, views, settings, or some combination thereof. For example, a shared state may be a view, which is a table based on the result-set of an SQL statement. A shared state of a coordinator frontend may be one instance of a shared state, such as one instance of an object. An object may be a data structure used to store or reference data, such as a table. Objects may also be indexes, procedures, properties, parameters, views, or some combination thereof.

An AST, such as depicted AST 110, may be data organized in a data structure generated by a compiler frontend and transmitted to a serializer/deserializer (SerDe). An AST is a data structure that includes data representing a query. An AST may be generated by a user program, instead of by parsing a query. An AST of the coordinator frontend may be referred to as $AST_1$, frontend AST, or as a first AST to differentiate it from one or more ASTs of the coordinator backend. In an embodiment, an AST is a tree data structure that is a language-agnostic, hierarchical representation of elements for at least a portion of a query. An AST may include live code, function references, environment references, or some combination thereof. An AST may include live code such as user functions or filters. An AST may include generated objects such as user types. An AST may include context-specific information such as a reference to a view or runtime configurations. An AST may be analyzed, optimized, planned, and executed by a coordinator frontend to generate results requested by a user.

A serializer/deserializer (SerDe or SerDes), such as depicted SerDe 112, may include software and/or hardware to perform functions described and attributed to it herein. A Ser/De includes a serializing component and deserializing component. Serialization is a process of translating a data structure or object state into a format that can be transmitted over a network and stored in memory. A SerDe may translate an AST into a series of bytes to be transmitted over a network. In an embodiment, a SerDe that serializes an AST into a series of bytes allows transmission of data representing an AST between a coordinator frontend and coordinator backend, which in turn allows user code to be prevented from interacting with processes on the coordinator backend, which is responsible for generating a query plan as described further herein. A SerDe may deserialize data and translate a series of bytes into a data structure such as an AST and as described further herein.

An AST reverse cache, such as depicted AST reverse cache 114, may include software and/or hardware to perform functions described and attributed to it herein. An AST reverse cache is a cache that stores data that represents a node of an AST and as described further herein. If a node of an AST, such as its root node, is stored in a reverse cache, that AST is not serialized by a SerDe of the coordinator frontend. Instead, it serializes an identifier for that node and sends it to the coordinator backend as described further herein. A cache may be memory configured to store data and allow that data to be retrieved faster than if stored in another type of storage.

Serialized data, such as serialized data 116, is data that represents an AST that has been serialized by a SerDe to be transmitted to a coordinator backend. Serialized data may include a series of bytes that includes shared state information. Serialized data may be a byte array, stream, or buffer. Serialization may be performed by following an algorithm, such as the algorithm described further herein, or any other algorithm that allows a SerDe to deserialize the data back into an AST.

Within a coordinator frontend, according to an embodiment, a compiler frontend has a communicative connection with a shared state component, and a SerDe, wherein the compiler frontend can receive data from and send data to the shared state component as well as send an AST to the SerDe. In an embodiment, a SerDe has a communicative connection with a compiler frontend, a shared state component, an AST reverse cache, and a SerDe of a coordinator backend. A SerDe may receive data from a compiler frontend, and a shared state component as well as receive data from and send data to an AST reverse cache. In an embodiment, a SerDe sends serialized data to another SerDe of the coordinator backend. In an embodiment, an execution result, such as depicted execution result 138, is sent via a coordinator frontend to a user, wherein an execution result is described further herein.

The distributed database system 100 may include capabilities for executing user-defined functions. User-defined functions, which might also be referred to as user functions, user code, and so on, can include processor-executable code, intermediate code, interpretable code, and so forth. Examples of user-defined functions include routines that accept one or more parameters, and return one or more values as output. User-defined functions provide significant and useful flexibility, but may be associated with a degree of risk, particularly in multiuser environments. For example, a user-defined function might contain "trojan horse" code that is intended to obtain access to which the user is not entitled.

The distributed database system 100 may also include support for secured access to certain types of tables or other data sources, such as tables or other data sources which include data owned by multiple users, where each user may have a different set of permissions. For example, a given user might be permitted to access the data owned by that user, but not permitted to access data owned by any other user.

In order to operate at high speed, embodiments of the distributed database system 100 might execute a user-defined function within an executor, and implement access control within a query coordinator. However, this approach presents a security problem. User-submitted code, when executed, may potentially have the ability to inspect and/or alter the contents or behavior of the application it is running in or the system it is running on, including one or more of a process, virtual machine, or computing device. This may be the case whether or not such usage is intended. Furthermore, the user-defined function may leave behind running code that can compromise the system even after the user-defined function executes.

A distributed database system may, in some embodiments, execute a query according to the following steps. First, the user may submit the query by providing SQL text or invoking one or more application programming interfaces ("APIs"). The query is then transformed into an AST that may be used to generate a query plan. An AST node may include fields related to expressions, operators, functions, statements, catalog objects, or some combination thereof. A query plan may take the form of a tree data structure, where the leaf nodes of the tree may typically represent operations that read data from a data source. The ancestors of these nodes may describe various operations that might be performed on this data, such as sorting, filtering, joining, and so forth. The resulting query plan may then be transformed into an executable plan, made up of a set of stages. The stages may have dependencies, such as one stage requiring input that is to be provided by the execution of another stage. A query coordinator then orchestrates execution of these stages by sending them to the query engine executors. The executors may then execute the respective stages.

To address security issues, embodiments may include a coordinator frontend, such as coordinator frontend 102 discussed in conjunction with FIG. 1. Once an AST is generated based on a user query, it is serialized and sent to a coordinator backend, such as coordinator backend 202 discussed in conjunction with FIG. 2, where the AST is deserialized and sanitized prior to being compiled into a query plan to be executed by query engine executors.

In at least one embodiment, as used in any implementation described herein, unless otherwise clear from context or stated explicitly to contrary, terms such as module, component, engine, and nominalized verbs (e.g., compiler, and/or other terms) each refers to any combination of software logic, firmware logic, hardware logic, and/or circuitry configured to provide functionality described herein. In at least one embodiment, software may be embodied as a software package, code and/or instruction set or instructions, and hardware, as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

Figure 2:
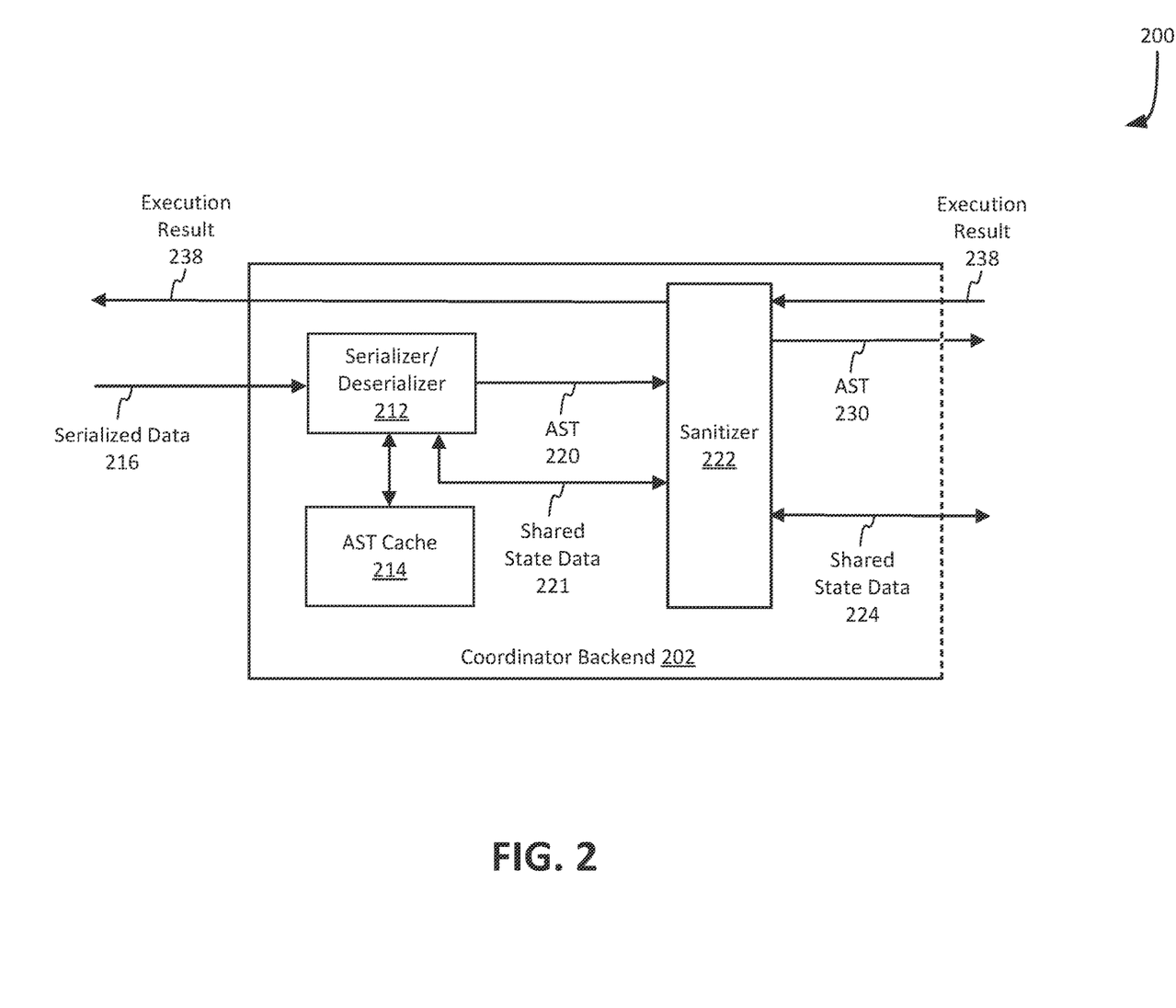
FIG. 2 illustrates an example of a distributed database system deserializing serialized data to generate an AST, in accordance with at least one embodiment.

FIG. 2 illustrates an example of a distributed database system 200 processing ASTs in accordance with at least one embodiment. In this example embodiment, distributed database system 200 comprises coordinator backend 202, serialized data 216 sent from a coordinator frontend, serializer/deserializer (SerDe) 212, AST cache 214, AST 220, shared state data 221, sanitizer 222, shared state data 224, AST 230, and execution result 238. In at least an embodiment, distributed database system 200 is part of distributed database system 100.

Serialized data, such as depicted serialized data 216, is sent by a coordinator frontend, such as the depicted coordinator frontend 102 of FIG. 1, may include data representing an AST generated from a query. In at least an embodiment, serialized data 216 is serialized data 116 as depicted in FIG. 1. Serialized data may be a series of bytes transmitted over a network connection and may represent an AST including shared state information as described further herein at least in conjunction with FIG. 1.

Figure 3:
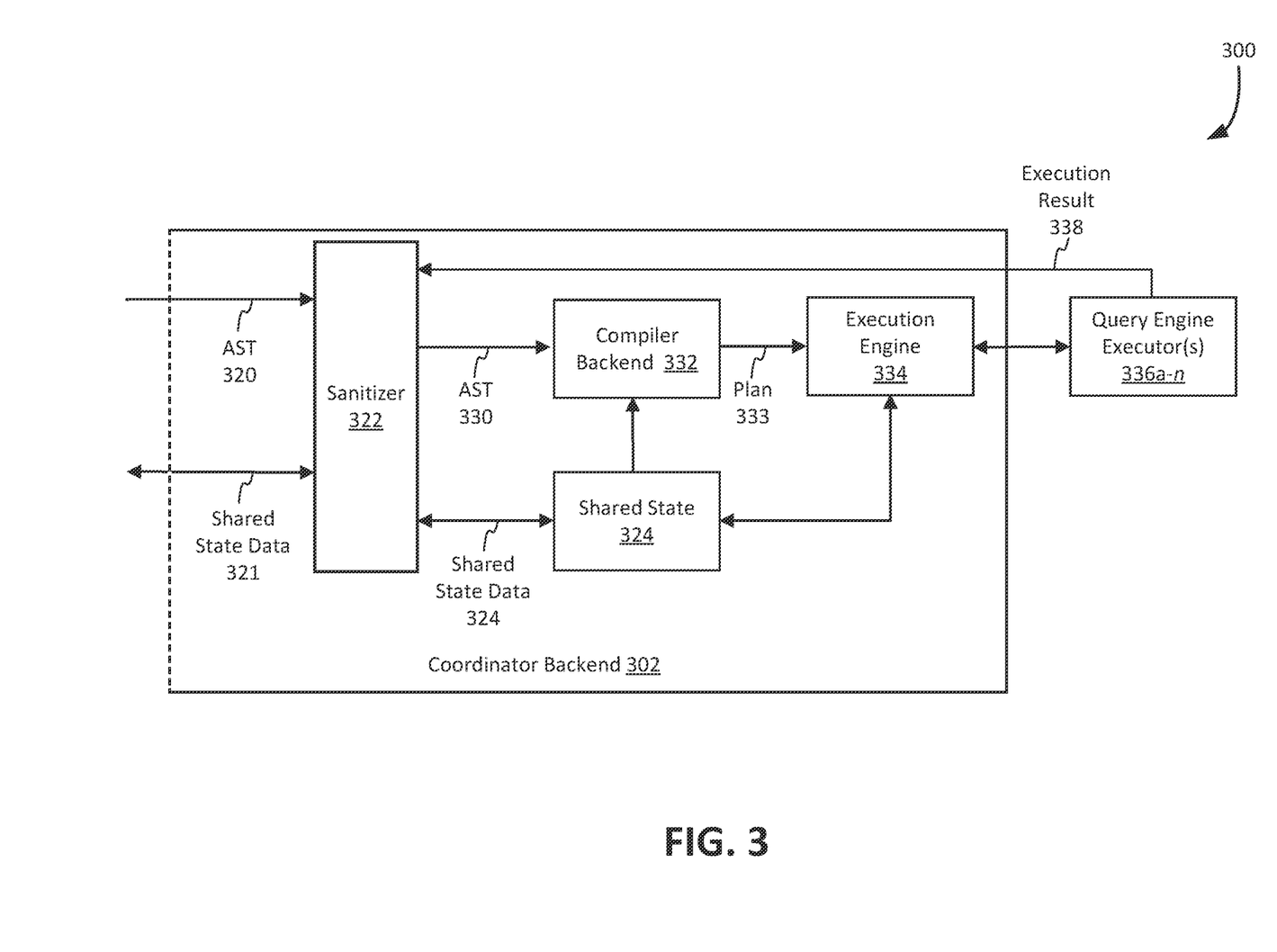
FIG. 3 illustrates an example of aspects of a distributed database system sanitizing an AST, in accordance with at least one embodiment.

The distributed database system 200 includes a coordinator backend, such as depicted coordinator backend 202, that may include software and/or hardware to perform functions described and attributed to it herein. In an embodiment, a coordinator backend includes a SerDe, an AST cache, at least two ASTs, at least two versions of shared state data, and a sanitizer, which are described further herein. A coordinator backend may be separated from other portions of the distributed database, such as a coordinator frontend, by being located in its own security domain. A user or user program may access a coordinator frontend but is prevented from accessing a coordinator backend. In at least an embodiment, a coordinator backend is configured to receive serialized data from a coordinator frontend. In an embodiment, any component of a coordinator backend has a communicative connection with at least one other component of that coordinator backend. Coordinator backend 202 is partial depiction of a coordinator backend, while the remainder of the coordinator backend is depicted in FIG. 3, according to an embodiment. In other embodiments, any component of a coordinator backend may be implemented on the coordinator frontend, and any component of a coordinator frontend may be implemented on the coordinator backend.

A SerDe, such as depicted SerDe 212, may include software and/or hardware to perform functions described and attributed to it herein. In an embodiment, SerDe 212 is a Ser/De that shares one or more aspects of a SerDe as described at least in conjunction with FIG. 1. A SerDe of a coordinator backend may receive and translate a series of bytes that has transmitted over a network connection into an AST. A SerDe may translate a series of bytes into an AST, such as depicted AST 220, that shares at least one aspect of an AST generated by a coordinator frontend. A SerDe may incorporate shared state data, such as depicted shared state data 221, when generating an AST. Shared state data used by a SerDe, whether on a frontend coordinator or backend coordinator, may be referred to as an auxiliary input. Shared state data may be sent from a shared state component of a coordinator backend via a sanitizer as described further herein at least in conjunction with FIG. 3.

An AST cache, such as depicted AST cache 214, may include software and/or hardware to perform functions described and attributed to it herein. An AST cache is a cache that stores identifying data, such as a unique identifier, that represents a node of an AST and as described further herein. If a header included in serialized data includes a unique identifier for a node, and that unique identifier is stored in an AST cache, then a coordinator backend returns that node, which has been stored in memory. In an embodiment, an AST cache shares at least one aspect of an AST reverse cache as described at least in conjunction with FIG. 1.

An AST, such as depicted AST 220, may be data organized in a tree data structure generated by a SerDe that has translated serialized data. In an embodiment, AST 220 shares at least one aspect of an AST of the coordinator frontend as described further herein at least in conjunction with FIG. 1. An AST, such as depicted AST 220, may be referred to as an $AST_2$, a backend AST, or a second AST to differentiate it from an AST of the coordinator frontend. In an embodiment, an AST generated by a SerDe of a coordinator backend is shares at least one aspect with or may be identical to an AST generated by a coordinator frontend. A SerDe may generate and send an AST to a sanitizer component to analyze the AST for a security risk as described further herein.

A sanitizer, such as depicted sanitizer 222, may include software and/or hardware to perform functions described and attributed to it herein. In an embodiment, a sanitizer is a component that analyzes an AST generated by a SerDe to determine any security risks, including risks posed by unauthorized access by a user, exposure to user code, unauthorized changes to a shared state, or some combination thereof. A sanitizer may ensure that any security rules implemented by a query engine coordinator are enforced on an AST generated by a SerDe. In response to analyzing an AST for security risks, a sanitizer may send an analyzed AST, such as AST 230, to a compiler backend as described further herein at least in conjunction with FIG. 3. An analyzed AST may be referred to as a sanitized AST or cleansed AST. A sanitizer may analyze shared state data, such as depicted shared state data 224, for security risks sent from a shared state component of a coordinator backend as described further herein at least in conjunction with FIG. 3. A sanitizer may send analyzed shared state data to a SerDe of a coordinator backend. A sanitize may analyze for security risks an execution result, such as depicted execution result 238, sent from a query engine executor, before sending the execution result to a coordinator frontend, where an execution result is described further herein at least in conjunction with FIG. 3.

FIG. 3 illustrates an example of aspects of a distributed database system 300 executing functions on sandboxed executors, in accordance with at least one embodiment. In an embodiment, distributed database system 300 is part of distributed database system 100 and/or distributed database system 200. In this example embodiment, distributed database system 300 comprises coordinator backend 302, AST 320, shared state data 321, sanitizer 322, shared state data 324, AST 330, compiler backend 332, plan 333, shared state data 324, execution engine 334, query engine executor(s) 336*a-n*, and execution result 338. In an embodiment, coordinator backend 302, AST 320, shared state data 321, sanitizer 322, shared state data 324, and AST 330 are coordinator backend 202, AST 220, shared state data 221, sanitizer 222, shared state data 224, and AST 220 as described further herein at least in conjunction with FIG. 2.

A compiler backend, such as depicted compiler backend 332, may include software and/or hardware to perform functions described and attributed to it herein. In an embodiment, a compiler backend receives an AST, such as AST 330, that has been generated by a sanitizer, such as sanitizer 322. A compiler backend may generate a query plan, such as plan 333, based on an AST and shared state information received from a shared state component, such as shared state 324. A compiler backend may share at least one aspect with a compiler frontend as described in conjunction with at least FIG. 1. A query plan, which is described further herein, is a set of instructions that a distributed database system executes in order to access data in response to a query.

A shared state, such as depicted shared state 324, may include software and/or hardware to perform functions described and attributed to it herein. A shared state may be a component on a coordinator backend that may include at least one aspect in common with a shared state component on a coordinator frontend as described further herein at least in conjunction with FIG. 1. A shared state component of a coordinator backend may store shared state information identical to that stored on a shared state component of a coordinator frontend. In an embodiment, shared state 324 is another instance of shared state 108. Shared state information may be received from an execution engine, such as execution engine 334 as described further herein.

An execution engine, such as depicted execution engine 334, may include software and/or hardware functions described and attributed to it herein. An execution engine distributes at least a portion of a query plan to one or more query engine executors, such as query engine executor(s) 336*a-n*. In an embodiment, an execution engine may be a component on a coordinator backend that translates a query plan into steps, segments, and streams. A step is an individual operation needed during query execution, and multiple steps can be combined to allow compute nodes to perform a query, join, or other database operation. A segment is a combination of several steps that can be done by a single process, and is the smallest compilation unit executable by a compute node slice, which is a unit of parallel processing. A stream is a collection of segments to be parceled out over compute node slices.

Query engine executors, such as depicted executor(s) 336*a-n*, may include software and/or hardware functions described and attributed to them herein. A query engine executor may include one of the computing nodes that make up a distributed database system. Query engine executors assist in the processing of a query by each performing one or more stages of an execution plan. The stages can comprise operations such as accessing a table, joining data from different tables, sorting data, executing user-defined functions, and so on. A query engine executor may be implemented in an environment securely separated from a backend coordinator and/or a frontend coordinator. Query engine executors output a result from a query, also known as an execution result, such as depicted execution result 338, to a user via a coordinator backend and coordinator frontend.

Figure 4:
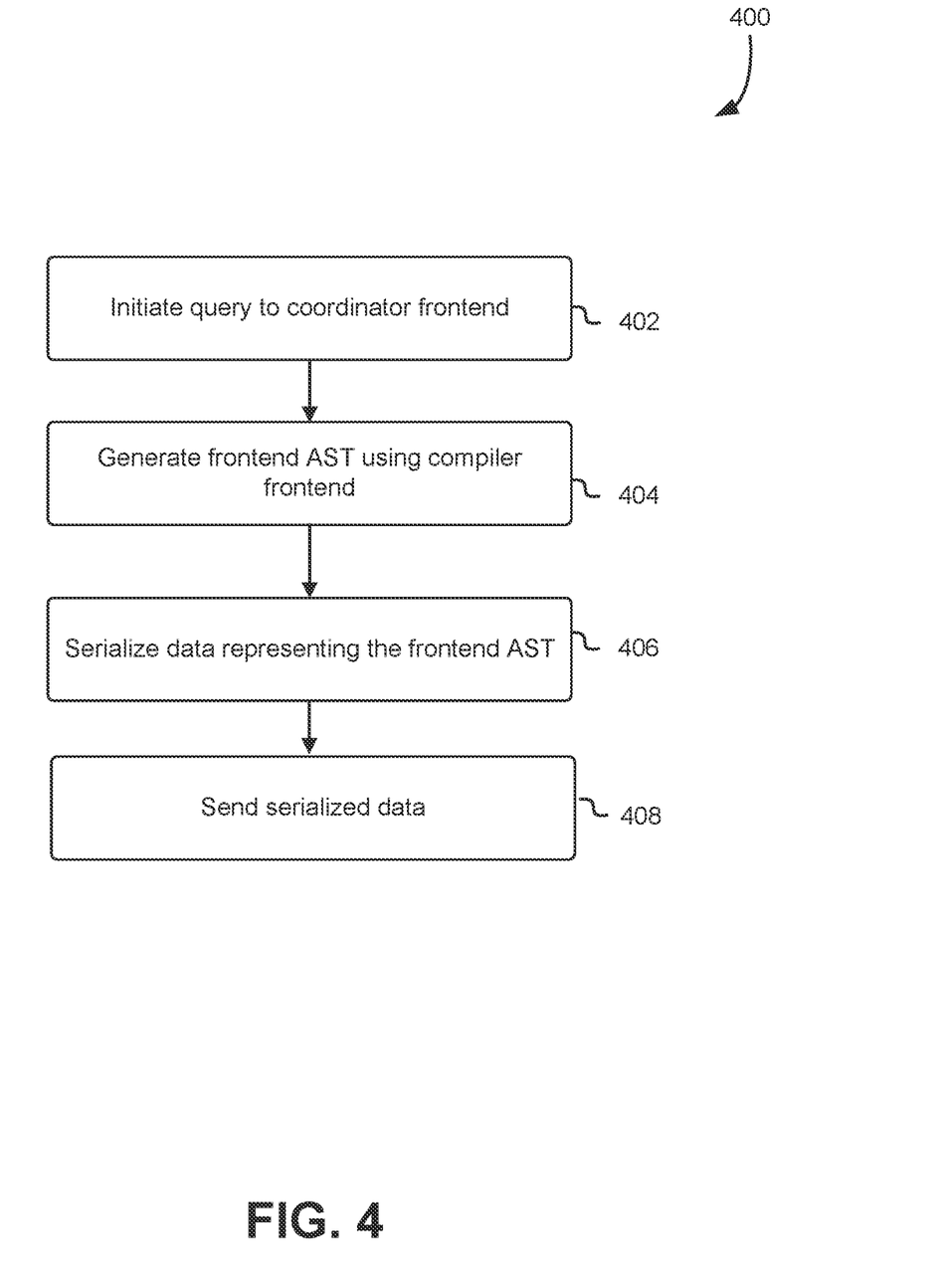
FIG. 4 illustrates an example process of a distributed database system serializing an AST, in accordance with at least one embodiment.

FIG. 4 illustrates an example process 400 of a distributed database system processing an AST on a coordinator frontend with at least one embodiment. Although the example process 400 of FIG. 4 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. One or more aspects of one or more embodiments of process 400 can be combined with one or more aspects of one or more embodiments described herein at least in conjunction with FIGS. 1-3 and 5-7.

At 402, a query is initiated on a coordinator frontend, wherein a query is described further herein. In an embodiment, a user submits a SQL text to the coordinator frontend. Alternatively, a user may write a program that invokes APIs on a coordinator frontend that are equivalent to writing SQL text.

At 404, based on the SQL text or user program, a compiler frontend generates and/or mutates an AST, a frontend AST, by parsing the SQL text or the API calls. When a user wants to evaluate the result of their query, a request is sent to the coordinator frontend to initiate the execution pipeline, wherein the coordinator frontend initiates a new session with a coordinator backend. Once a frontend AST is generated, a SerDe of the coordinator frontend receives the AST for serialization so it may be sent to the coordinator backend.

At 406, a SerDe analyzes the AST and determines how to serialize data representing the AST. A SerDe begins with a root node, N, of the frontend AST and searches for N in a reverse cache, as described further herein at least in conjunction with FIG. 1. If N is present with an identifier, $ID_N$, in the reverse cache, the SerDe serializes a reference indicator, Reference ($\rightarrow I_{DN}$), to serialized data, S, and does not recurse down from the root node, N. The SerDe may perform its search, or lookup, based on values such as an object id, object hash, semantic hash based on a subtree rooted at N, or some combination thereof. If N is not present, the SerDe determines if the root node, N, is a stateful object. If N is a stateful object, the SerDe writes Placeholder (Type, [Params]) to serialized data, S, where Type is a unique identifier denoting the type of stateful object, such as live code, that contain elements that may change. A stateful object may be a data structure that stores or references data values that may change, and retains the values as they change, which may be referred to as retaining the object's state. In an embodiment, a stateful object is an object where the query engine keeps track of the state of the object by storing values in memory and can be processed by using those stored values. Params is an optional list of values summarizing what is unique about the stateful object, values representing information related to a connection type, a remote host, a port, a file name, or some combination thereof. After writing a placeholder, the SerDe does not recurse down from N. If N is a stateful object that is a live function reference written in some arbitrary programming language, the SerDe may record the function name and signature and/or fetch the bits associated with the function and its state (closure) and serialize those in lieu of a name and then record the function's signature. If a SerDe determines that N is a stateful object, the SerDe generates an unique identifier for N, $I_{DN}$, and enters $I_{DN}$ into the reverse cache, (N→$I_{DN}$). The SerDe then treats the stateful object as a new object, and writes the new object's serialization header, NewObject(Type, $I_{DN}$, [ . . . ] S, where Type is the object's type, such as Java class; $I_{DN}$ is the identifier written to the reverse cache, and [ . . . ] represents other information if needed. A new object is an object not previously stored in memory accessible by a query coordinator.

As part of operation 406, a SerDe lists all fields, $N_F$, for root node, N, where fields may be referred to as properties. For each field of the root node, the SerDe writes the field name to the serialized data, S; and recursively performs for each field the same operations performed on the root node as a stateful object. Fields for the root node may include references to children, among other properties, so the entire AST rooted at N will be processed. In an embodiment, a SerDe serializes a data structure that is not an AST.

At 408, a coordinator frontend sends serialized data, S to a coordinator backend. The coordinator backend may respond with a message indicating "Node id X not found," or similar, as described further in conjunction with FIG. 5. If a node identifier, X, is not found, the coordinator backend looks up node X, $N_X$, in the reverse cache and retrieves that node, $N_X$; and the coordinator backend invokes the SerDe of the coordinator frontend to serialize $N_X$, forcing the SerDe to skip the recursive operations performed on the root node as a stateful object with operation 406.

Figure 5:
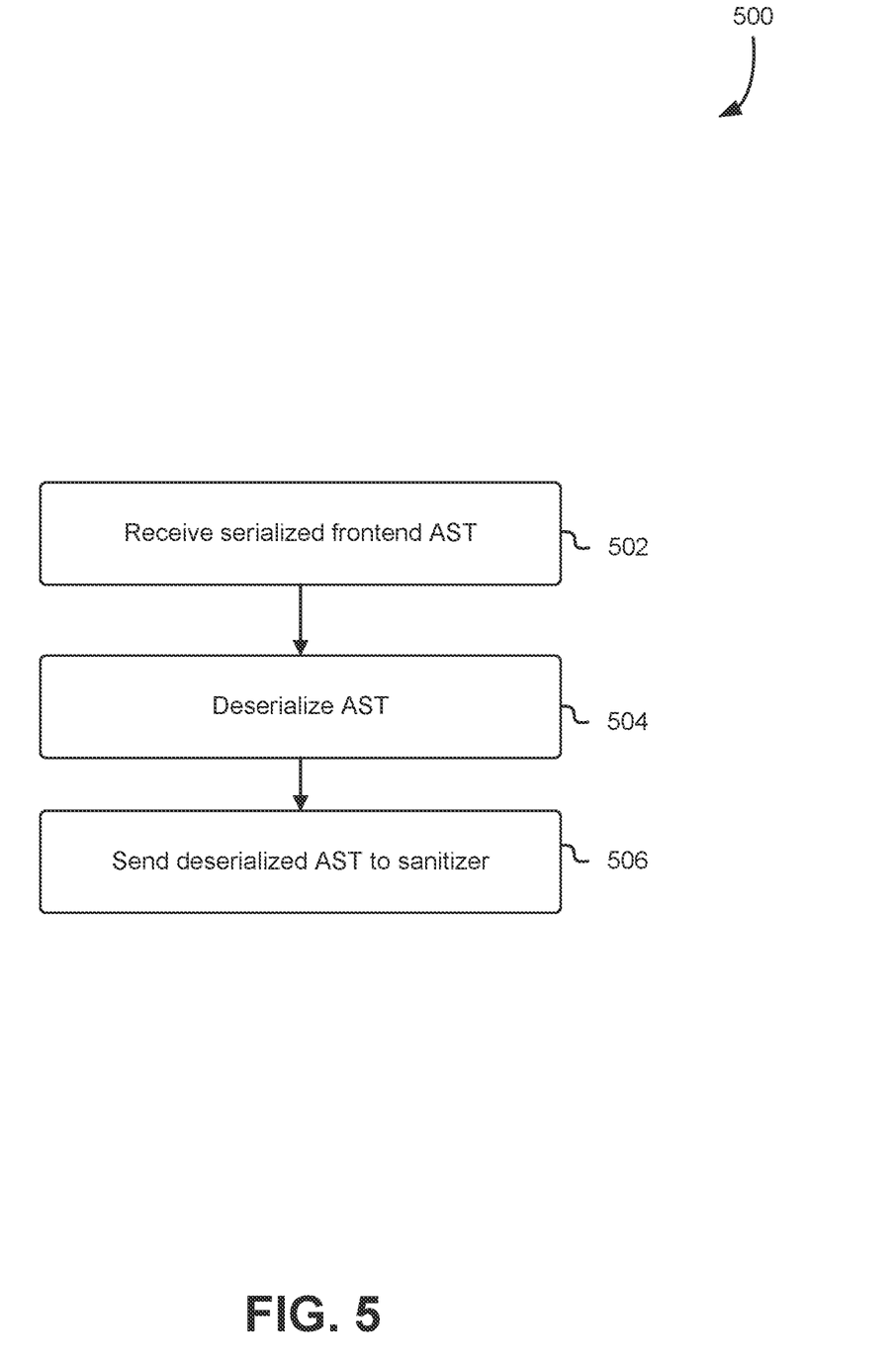
FIG. 5 illustrates an example process of a distributed database system deserializing serialized data, in accordance with at least one embodiment.

FIG. 5 illustrates an example process 500 of a distributed database system deserializing serialized data representing an AST in accordance with at least one embodiment. Although the example process 500 of FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. One or more aspects of one or more embodiments of process 500 can be combined with one or more aspects of one or more embodiments described herein at least in conjunction with FIGS. 1-4 and 6-7.

At 502, a coordinator backend receives serialized data that represents an AST. After receiving serialized data, a SerDe on the coordinator backend recursively performs an algorithm in order to determine how to deserialize and/or generate an AST based on the serialized data. Receiving serialized data representing an AST on a coordinator backend allows a query coordinator to prevent at least a portion of user code of the coordinator frontend from interacting with the coordinator backend as the coordinator backend sanitizes the AST and generates a query plan for execution.

At 504, a SerDe on the coordinator backend reads the object header of the serialized data, S, and if the header is a reference identifier, such as Reference (→$I_{DN}$), the SerDe of the coordinator backend looks up $I_{DN}$ in an AST cache, which is also of the coordinator backend. Deserializing data, such as an AST, may include retrieving from memory previously deserialized data, or any data not in serialized form. If SerDe identifies a node identified with $I_{DN}$ in the AST cache, the coordinator backend sends or returns the node to the SerDe. If the node identified with $I_{DN}$ is not found in the AST cache, the coordinator backend generates an error message "Node id ID not found," or similar, which is propagated back to the coordinator frontend and handled as described in conjunction with operation 408 of process 400. If the SerDe of the coordinator backend reads the object header to be a placeholder, such as Placeholder (Type, [Params]), the SerDe either creates or fetches the appropriate object representation for the placeholder. For example, the SerDe of the coordinator backend may create a new network connection, open a file handle, or for live code, look up or instantiate the appropriate function. The SerDe also returns the object representation for the placeholder to the user.

If the SerDe reads the object header to include a new object, such as NewObject (Type, $I_{DN}$, [ . . . ] S, the SerDe reads all fields that were serialized as part of operation 406 as described in conjunction with process 400, and writes those fields into $N_F$. The SerDe also identifies a function, F, that takes in arguments $N_F$, or a subset of $N_F$, and instantiates an object N of type Type. A function may be a constructor type, a hand-written function, or a result of a search within a library of functions, such as a search by reflection in Java. The SerDe records object N as $I_{DN}$ into the AST cache of the coordinator backend, and N is returned as a result. At 506, a SerDe on the coordinator backend sends deserialized data to a sanitizer, which is described further herein at least in conjunction with FIG. 2. Deserialized data may include one or more types of data, including data representing an AST, a new object, a function, or some combination thereof, and as described further herein at least in conjunction with operation 504.

Figure 6:
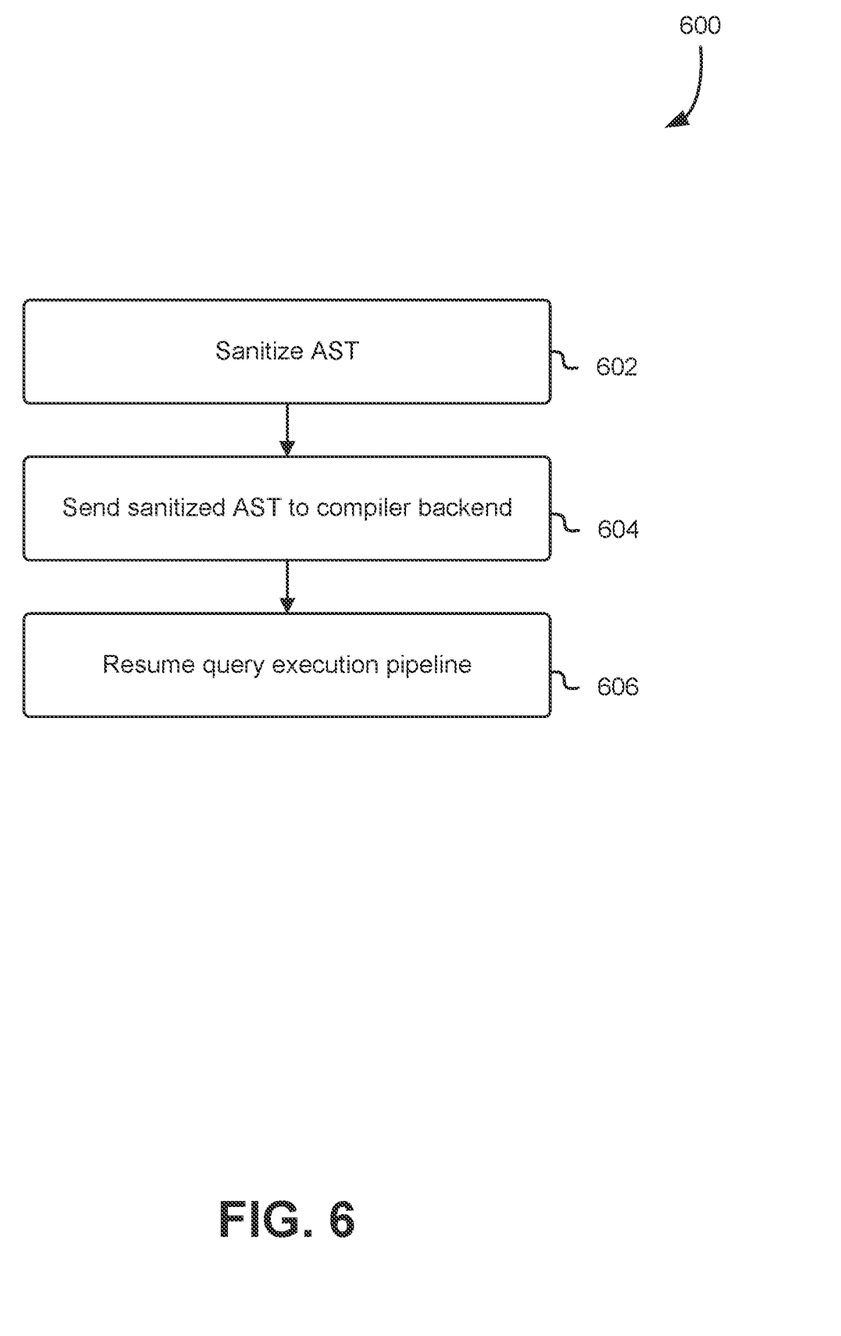
FIG. 6 illustrates an example process of a distributed database system sanitizing an AST, in accordance with at least one embodiment.

FIG. 6 illustrates an example process 600 of a distributed database sanitizing an AST and generating a query plan for execution, in accordance with at least one embodiment. Although the example process 600 of FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. The input may be one or more values. One or more aspects of one or more embodiments of process 400 can be combined with one or more aspects of one or more embodiments described herein at least in conjunction with FIGS. 1-5 and 7.

At 602, a coordinator backend runs an AST generated by a SerDe, such as a second AST as described further herein at least in conjunction with FIG. 2, through a sanitizer component. The sanitizer analyzes the second AST for security risks prior to generating a sanitized AST to be processed by the rest of the query execution pipeline. The sanitizer component may, for example, re-validate that the user that initiated the query has access to the data sources the user desires to query. The sanitizer component may apply additional security rules, such as a rule that a user may only access certain rows or columns of a data table. The sanitizer component may verify and/or isolate any user code embedded within the second AST and generate a sanitized AST.

At 604, a sanitized AST is sent to a compiler backend of the coordinator backend. The compiler backend generates a query plan based, at least in part, on the sanitized AST generated by a sanitizer with operation 602, and shared state information stored in a shared state component of the coordinator backend. The shared state information may be another instance and be identical to shared state information stored in a shared state component of the coordinator frontend. With operation 604, a compiler backend proceeds as if a query engine coordinator were not separated into a frontend or backend. For example, the compiler backend may process the sanitized AST as if that AST were the original AST generated by the compiler frontend.

At 606, once a compiler backend generates a query plan with operation 604, it sends that query plan to an execution engine to resume query pipeline execution processes. The execution engine may translate the query plan into steps, segments, and streams as described further herein at least in conjunction with FIG. 3. Then query engine executors execute portions of the query plan to return a result to a user.

Figure 7:
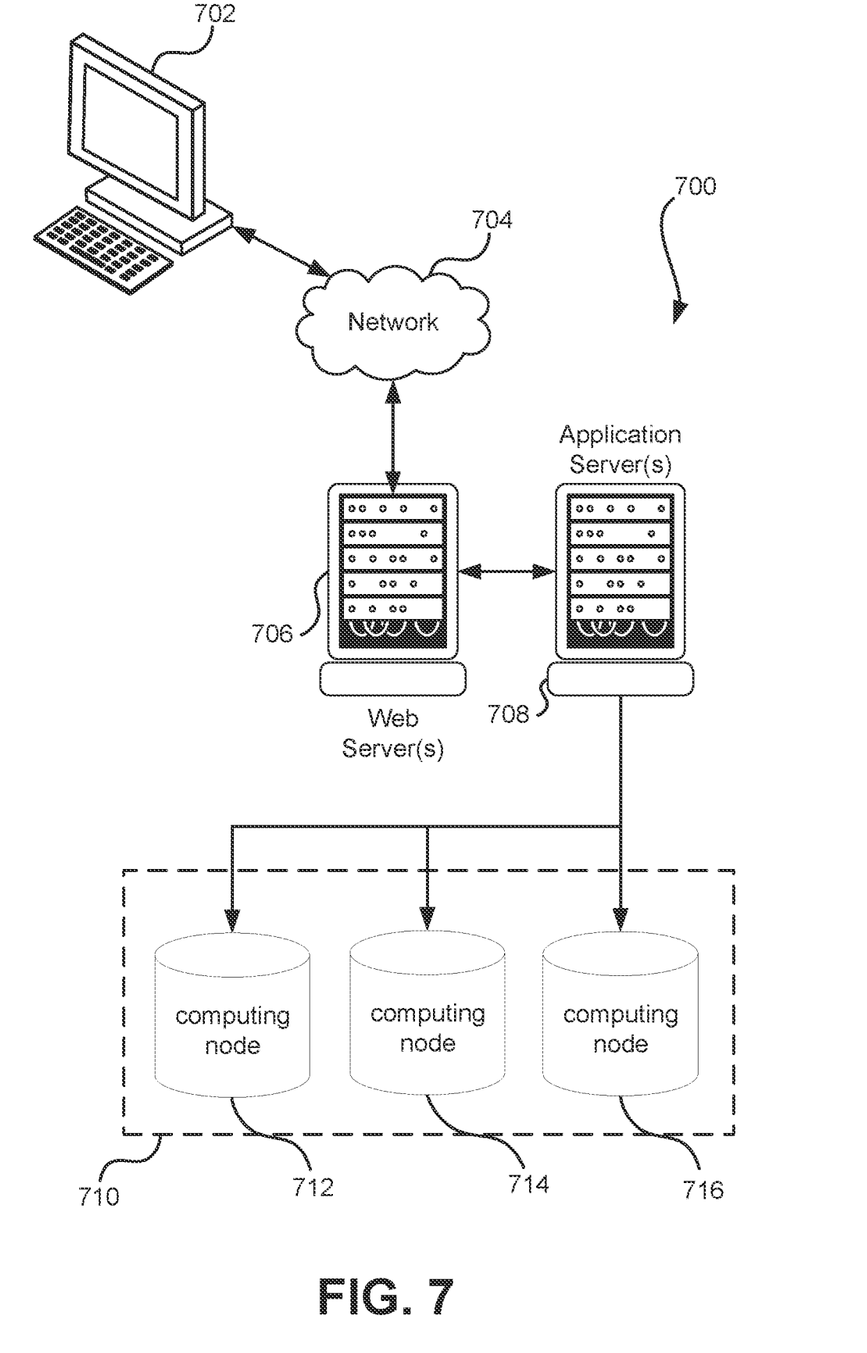
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a distributed database 710, and it should be understood that there can be several application servers, layers or other elements, processes or components, which may be chained or otherwise configured, which can interact to perform tasks such as obtaining data from an appropriate data store. The distributed database 710, in at least one embodiment, corresponds to a distributed database described herein in relation to the preceding figures. The distributed database 710 can comprise a plurality of computing nodes 712, 714, and 716. The computing nodes 712, 714, and 716 may, for example, correspond to executors and a query engine as described in relation to FIG. 1, and others of the preceding figures.

Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The distributed database 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the distributed database 710.

The distributed database 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A, B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   one or more computing devices comprising at least one processor and at least one memory that stores computer-executable instructions that, in response to execution by the at least one processor, cause the system to at least:
   receive a query at a query coordinator;
   generate, by a frontend of the query coordinator, a first abstract syntax tree (AST) based, at least in part, on the query;
   serialize, by the frontend of the query coordinator, data that represents the first AST;
   generate, by a backend of the query coordinator, a second AST based, at least in part, on the serialized data;
   evaluate, by a sanitizer of the backend of the query coordinator, the second AST for a security risk by at least enforcing one or more security rules;
   generate, by the backend of the query coordinator, a third AST that is a modified version of the second AST in which the security risk is mitigated; and
   cause a query plan based, at least in part, on the third AST to be executed by a query engine executor sandboxed from the frontend and the backend of the query coordinator.

2. The system of claim 1, wherein the frontend of the query coordinator is in a security domain separate from the backend of the query coordinator.

3. The system of claim 1, wherein an object header is generated to comprise the serialized data that represents the first AST and indicates that a node of the first AST has been at least one of previously serialized, is a stateful object, or is a new object.

4. The system of claim 1, wherein:
   the query coordinator comprises two instances of shared state information;
   the first AST is based, at least in part, on one instance of the two instances; and
   the second AST is based, at least in part, on another instance of the two instances.

5. The system of claim 1, wherein the second AST is based, at least in part, on a previously serialized AST when an identifier representing the first AST is matched to an identifier stored in memory.

6. A computer-implemented method of processing a query of a database, comprising:
   receiving a query at a query coordinator;
   generating, by a frontend of the query coordinator, a first abstract syntax tree (AST) based, at least in part, on the query;
   serialize, by the frontend of the query coordinator, the first AST;
   transmitting the serialized first AST to a backend of the query coordinator;
   generating, by the backend of the query coordinator, a second AST based at least on the serialized first AST;
   evaluate, by a sanitizer of the backend of the query coordinator, the second AST for a security risk by at least enforcing one or more security rules; and
   cause a query plan based at least on the second AST to be executed by a query engine executor sandboxed from the frontend and the backend of the query coordinator.

7. The computer-implemented method of claim 6, wherein the frontend of the query coordinator is in a security domain separate from the backend of the query coordinator.

8. The computer-implemented method of claim 6, wherein serializing the first AST comprises generating an identifier for at least one node of the first AST.

9. The computer-implemented method of claim 6, wherein serializing the first AST includes shared state information as an input.

10. The computer-implemented method of claim 6, wherein generating the second AST is based on shared state information of a backend of the query coordinator that is identical to shared state information of a frontend of the query coordinator.

11. The computer-implemented method of claim 6, wherein:
generating the second AST is based on retrieving at least one of its nodes stored in memory.

12. The computer-implemented method of claim 6, wherein:
generating the second AST is based, at least in part, on determining that a node of the first AST has previously been serialized.

13. The computer-implemented method of claim 6, wherein a third AST is generated based, at least in part, on identifying and mitigating the security risk identified in the second AST.

14. A non-transitory computer-readable storage medium storing thereon executable instructions that, as a result of being executed by one or more processors of a computer system, cause the computer system to at least:
generate a first abstract syntax tree (AST) based, at least in part, on a user program;
serialize data that represents the first AST;
send the serialized data from a frontend of a query coordinator to a backend of a query coordinator, wherein the backend of the query coordinator:
is in a security domain separate from the frontend of the query coordinator,
generates a second AST based at least on the first AST, evaluates, by using a sanitizer of the backend of the query coordinator, the second AST for a security risk by at least enforcing one or more security rules, and generates a query plan based, at least in part, on the second AST; and
cause the query plan to be executed by a query engine sandboxed from the frontend and the backend of the query coordinator.

15. The non-transitory computer-readable storage medium of claim 14, comprising further instructions that, as a result of being executed by the one or more processors, cause the computer system to:
identify the security risk in the second AST; and
generate a third AST that is a modified version of the second AST in which the security risk is mitigated.

16. The non-transitory computer-readable storage medium of claim 14, wherein the first AST is generated in the frontend of the query coordinator in the security domain separate from the backend of the query coordinator.

17. The non-transitory computer-readable storage medium of claim 14, wherein:
the query coordinator comprises two instances of identical shared state information.

18. The non-transitory computer-readable storage medium of claim 14, wherein the query plan is based, at least in part, on a third AST that is a modified version of the second AST.

19. The non-transitory computer-readable storage medium of claim 14 storing thereon further executable instructions that, as a result of being executed by the one or more processors of the computer system, cause the computer system to at least:
serialize the first AST based, at least in part, on a search in a cache for an indicator of at least one node of the first AST.

20. The non-transitory computer-readable storage medium of claim 14, wherein the serialized data comprises a serialized function.

* * * * *